July 30, 1935.  E. H. REED  2,009,519
MICROMETER CALIPER
Filed June 23, 1934
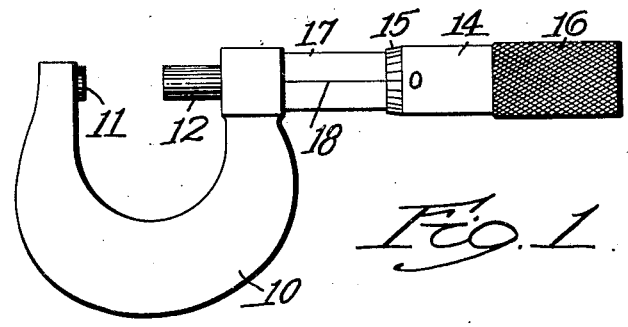
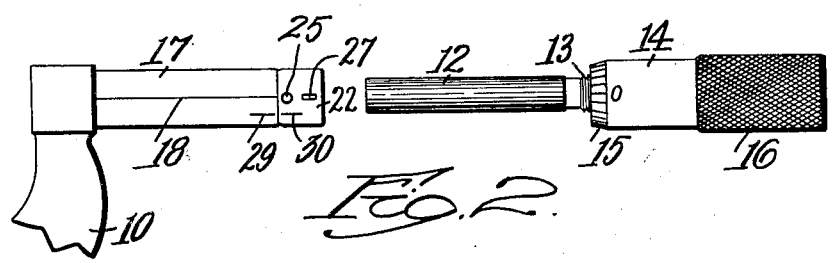
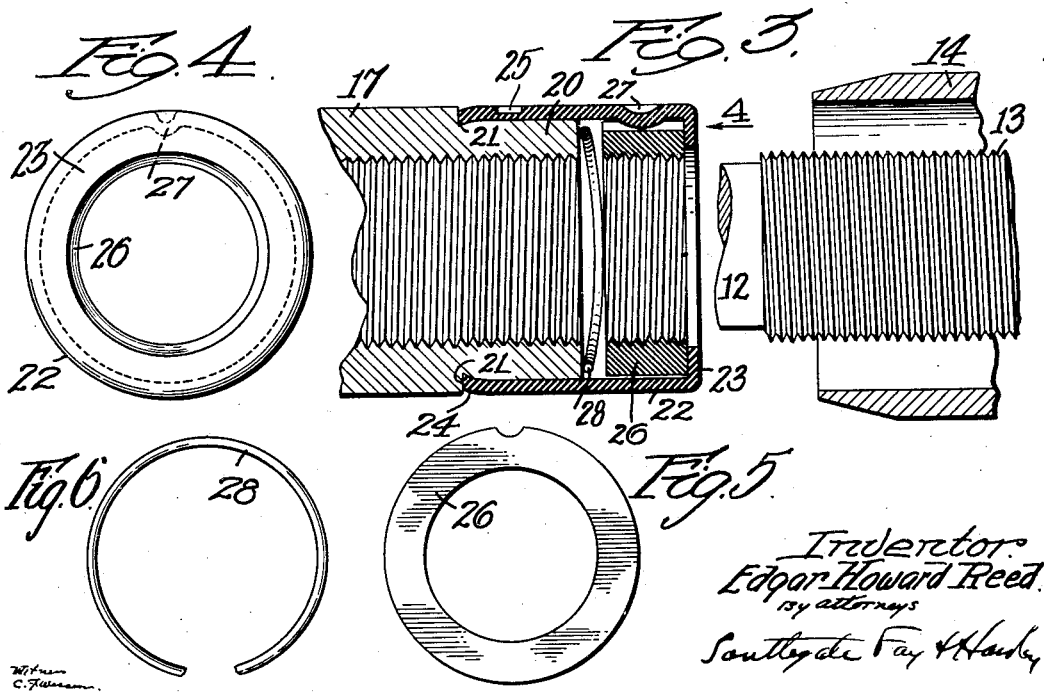
Inventor:
Edgar Howard Reed Patented July 30, 1935

2,009,519

UNITED STATES PATENT OFFICE 2,009,519

MICROMETER CALIPER

Edgar Howard Reed, Worcester, Mass.

Application June 23, 1934, Serial No. 732,103

5 Claims. (Cl. 33—164)

This invention relates to the construction of a micrometer caliper and is confined to that part of the caliper by which the spindle screw is held under constant tension against the threads of a nut which determines the relation of the measuring surfaces of the spindle and anvil.

The principal objects of this invention are to provide a tension member adjusted with relation to the micrometer barrel in such a way as to allow any degree of take-up that may be necessary; to provide a construction in which the parts effecting the tension are locked together and preferably cannot be taken apart during the life of the tool; to provide a construction of these parts in which the tension can be adjusted without taking out the spindle, and to provide means for showing directly on the barrel and the shell, in which the tension nut is located, the amount of adjustment that has been made to take up wear.

Other objects and advantages of the invention will appear hereinafter.

Reference is to be had to the accompanying drawing, in which

Fig. 1 is a side view of a micrometer caliper constructed in accordance with this invention;

Fig. 2 is a similar view, showing the spindle removed;

Fig. 3 is a diametrical sectional view of the end of the micrometer barrel, with the tension nut and associated parts, showing also the spindle and micrometer sleeve at the end thereof and removed therefrom;

Fig. 4 is an end view of the shell which holds the tension nut, taken in the direction indicated by the arrow 4 in Fig. 3;

Fig. 5 is an end view of the tension nut looking in the same direction, and

Fig. 6 is a similar view of the compression spring used between the tension nut and the end of the barrel.

There are two methods by which the closeness of fit between the spindle, thread and measuring nut are now adjusted. In one case longitudinal slits are provided in the barrel of the micrometer and a tapered thread on the outside of the barrel to which is fitted a similarly tapered nut. Taking up on the nut closes in on the barrel and measuring nut against the spindle threads. By the second method a check nut is held in fixed but changeable relation to the measuring nut. In the first arrangement, surfaces of the spindle thread and measuring nut are somewhat exposed to the entrance of dirt and the exit of lubricant, and in the second method, the spindle must be removed from the measuring nut to make the desired adjustment and in common practice the parts are separated and after adjustment are put together again. As the adjustment is by trial and error the tool must be taken to pieces each time the adjustment is made.

With my improved construction the parts are assembled when the tool is made and preferably are locked adjustably together for the life of the tool. The spindle does not have to be removed from the measuring nut to affect the desired change in tension.

The invention is shown as applied to a micrometer caliper having the usual frame or bow 10, anvil 11 and spindle 12. This spindle is provided with a screw thread 13 extending throughout a large part of its length as usual. The spindle is permanently fixed to a micrometer sleeve 14 which is provided with the usual scale 15 and knurled head 16 for turning the spindle.

Fixed permanently to the frame 10 is the micrometer barrel 17 which is provided with a zero line 18 for cooperating with the scale 15 in the usual way. This micrometer barrel is provided with a reduced end 20 of a general cylindrical shape which may be recessed inwardly at 21 where the reduced end terminates. A shell 22 of sheet metal having a flat end 23 provided with an opening for the spindle extends over the reduced portion 20 and has an inwardly projecting end 24 extending into the recess 21, this being used to prevent removal of the shell. This shell is also provided with a depression 25 for use in adjusting it, a spanner being employed to enter it to turn it for that purpose. Inside the shell is a tension nut 26 threaded on the inside, the threads being continuous with the threads on the inside of the barrel for receiving the screw 13. The shell is depressed to form a lug 27 which extends inwardly in the tension nut 26 to prevent the shell and nut from relative rotation. The nut 26 is lined up with the barrel 17 and they are spaced apart. Between them is a compression spring 28 to provide tension.

The tension nut floats in the shell 22 and the rotation of the nut is effected by rotating the shell. The shell is frictionally locked on the reduced end of the micrometer barrel but can be turned by a spanner for adjustment. The shell carries the tension nut with it at all times. In their initial position the threads of the nut and barrel form a single helix for the spindle. Rotation of the shell by the use of a spanner engaging in the depression 25 turns the tension nut which, on account of the spindle engaging the inside threads of this nut and of the micrometer barrel, compresses the spring 28 in proportion to the angle through which it is turned.

This action also draws the spindle against the measuring sides of the threads in the barrel with a force that is constant throughout the length of the thread of the spindle in its engagement with the threads in the micrometer barrel. This operation allows selection or restoration of the desired tension or "feel" in setting the micrometer. When so set the parts are locked together in such a way as to allow adjustment but the parts cannot be detached by any ordinary means. The adjustment can be made simply by turning the sleeve 14 back to expose the depression 25 without removing the spindle.

It will be seen that on account of the frictional adjustment any degree of take-up can be provided and this take-up is not confined to fixed steps as is the case where teeth are employed to hold the relation between the measuring nut and the tension nut. The initial setting of the tension nut is shown by two lines 29 and 30 on the micrometer barrel and the shell respectively. The amount of wear and tension are indicated by the circumferential space that appears between them. For adjustment it is not necessary to take out the spindle in order to adjust the tension and in the form illustrated the parts effecting tension are locked together in the manufacture of the device and cannot, in this case, be taken apart during the life of the tool.

Having thus described my invention and the advantages thereof, I do not wish to be limited to the details herein disclosed, otherwise than as set forth in the claims, but what I claim is:—

1. In a micrometer caliper, the combination with the barrel, threaded spindle, and measuring sleeve fixed to the spindle and having a scale, of a tension nut located at the end of the barrel, a sleeve connected with the nut and having means to turn said nut, said barrel and tension nut having screw threads fitting the thread on the spindle, yielding means for resisting the turning of the tension nut toward the barrel, said sleeve and barrel being of substantially the same diameter and longitudinal lines on the barrel and second sleeve normally in registering position to show the amount of wear after adjustment.

2. In a micrometer caliper, the combination of a micrometer barrel having a reduced end, a shell projecting over the reduced end and rotatable thereon, a tension nut, means for preventing the tension nut from rotating relatively to the shell, a compression spring between the end of the micrometer barrel and the tension nut to resist the movement of the nut toward the barrel, and a screw threaded spindle passing through the barrel and tension nut, the barrel and tension nut having threads both fitting said screw, the barrel and shell having longitudinal marks thereon for showing any adjustment that has been made in the tension nut to take up for wear.

3. In a micrometer caliper, the combination of a micrometer barrel having a reduced end, a shell projecting over the reduced end and rotatable thereon, a tension nut, said shell having an internal projection engaging the tension nut, a compression spring between the end of the micrometer barrel and the tension nut and engaging both to resist the movement of the nut toward the barrel, and a screw threaded spindle passing through the barrel and tension nut, the barrel and tension nut having threads both fitting said screw.

4. In a micrometer caliper, the combination of a micrometer barrel having a reduced end provided with a circumferential recess, a shell projecting over the reduced end and having an inward projection extending into said recess so as to be rotatable thereon, a tension nut, said shell having an internal projection engaging the tension nut to rotate the nut with the shell for adjustment, a compression spring between the end of the micrometer barrel and the tension nut to resist the movement of the nut toward the barrel, and a screw threaded spindle passing through the barrel and tension nut, the barrel and tension nut having threads both fitting said screw.

5. In a micrometer caliper, the combination with the barrel, threaded spindle, and measuring sleeve fixed to the spindle and having a scale, of a tension nut located at the end of the barrel, a sleeve connected with the nut and having means to turn said nut, said barrel and tension nut having screw threads fitting the thread on the spindle, and yielding means for resisting the turning of the tension nut toward the barrel, said sleeve and barrel being of substantially the same diameter.

EDGAR HOWARD REED.